(12) United States Patent  (10) Patent No.: US 7,791,821 B2
Katsumata et al.  (45) Date of Patent: Sep. 7, 2010

(54) LENS DRIVE APPARATUS

(75) Inventors: Minoru Katsumata, Chiba (JP);
Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/399,355

(22) Filed: Mar. 6, 2009

(65) Prior Publication Data

US 2009/0168208 A1  Jul. 2, 2009

Related U.S. Application Data

(63) Continuation of application No. PCT/JP2008/053032, filed on Feb. 22, 2008.

(30) Foreign Application Priority Data

Mar. 29, 2007  (JP) ............................. 2007-089447

(51) Int. Cl.
    *G02B 15/14*  (2006.01)
(52) U.S. Cl. ..................................... 359/699
(58) Field of Classification Search ................. 359/649, 359/699, 704, 822, 823; 348/345, 376; 396/79, 396/85; 353/101
    See application file for complete search history.

(56) References Cited

U.S. PATENT DOCUMENTS 7,330,648 B2 *  2/2008  Morinaga et al. ........... 396/144

2006/0216014 A1  9/2006  Morinaga et al. ........... 396/144

FOREIGN PATENT DOCUMENTS

| JP | 2005-195678 A1 | 7/2005 |
| JP | 2006-133574 A1 | 5/2006 |
| JP | 2007-10778 A1 | 1/2007 |

OTHER PUBLICATIONS

International Search Report for International Application No. PCT/JP2008/053032 dated Mar. 13, 2008.
Office Action issued on May 11, 2010 in a counterpart Chinese patent application No. 200880000909.X with English translation.

* cited by examiner

*Primary Examiner*—Joseph Martinez
(74) *Attorney, Agent, or Firm*—Kratz, Quintos & Hanson, LLP

(57) ABSTRACT

A lens drive apparatus includes: a base member; a holder having a cylindrical shape and movably supported in an optical axis direction relative to the base member; a cam member and moving the holder in the optical axis direction by abutting with the holder; and a biasing member urging the holder such that the holder 40 comes into contact with the cam member 50. The holder is formed such that a lens frame holding a lens is inserted and assembled into the holder from one side of the holder to another side of the holder. The cam member is disposed close to the one side with respect to the holder.

11 Claims, 5 Drawing Sheets

OBJECT SIDE

INSERT DIRECTION

IMAGE PICKUP DEVICE SIDE

LENS DRIVE APPARATUS

CROSS-REFERENCE TO RELATED APPLICATION

This application is a continuation of and claims priority to International Patent Application No. PCT/JP2008/053032 filed on Feb. 22, 2008, which claims priority to Japanese Patent Application No. 2007-089447 filed on Mar. 29, 2007, subject matter of these patent documents is incorporated by reference herein in its entirety.

BACKGROUND OF THE INVENTION

1. Field of the Invention

The present invention relates to a lens drive apparatus.

2. Description of the Related Art

Conventionally, there has been known a lens drive apparatus including a holder and a cam member. The holder is movably supported in the optical axis direction and hold a lens, and the cam member moves the holder in the optical axis direction (see Japanese Unexamined Patent Application Publication No. 2005-195678).

There is known a lens drive apparatus into which a lens is assembled in situ. FIG. 5 is a cross-sectional view of the aforementioned conventional lens drive apparatus. The conventional lens drive apparatus includes: a base member 10P; a cover member 20P; a guide rod 30P, a holder 40P; a cam member 50P; a biasing member 60P; a motor unit 70P and a gear 90P. The driving of the motor unit 70P allows the cam member 50P to rotate via the gear 90P. The cam member 50P has a cam surface 51P, and the cam surface 51P comes in contact with a cam follower 45P. The biasing member 60P urges the holder 40P toward the cam member 50P. Additionally, the holder 40P is movably supported by the guide rod 30P in the optical axis direction LA. Therefore, the rotation of the cam member 50P allows the cam surface 51P to activate the cam follower 45P, whereby the holder 40P moves in the optical axis direction LA.

In the conventional lens drive apparatus, a lens frame (not shown) holding a lens is inserted into the holder 40P in an inserting direction shown in the drawing, so that the lens frame is assembled into the holder 40P. Additionally, an opening 41P is formed in the holder 40P and a thread portion is formed at an inner periphery of the opening 41P. Likewise, a thread portion is formed at an outer periphery of the lens frame. The lens frame is inserted into the holder 40P and is rotated, thereby adjusting the screwing amount, and defining the position of the lens frame relative to the holder 40P.

However, in such a lens drive apparatus, when the lens flame is inserted, the holder 40P is pushed to the image pickup device side, and the pushed load concentrates on the cam follower 45P and the cam surface 51P. Thus, the parts, such as the cam follower 45P and the cam member 50P, are deformed and the accuracy thereof is degraded. As a result, the variation in the positional accuracy of the lens and the operational defect might occur.

SUMMARY OF THE INVENTION

It is therefore an object of the present invention to provide a lens drive apparatus, in which the accuracy of the parts is maintained, and the variation in the positional accuracy of the lens and the operational defect are prevented.

According to an aspect of the present invention, there is provided a lens drive apparatus including: a holder having a cylindrical shape and movably supported in an optical axis direction; a cam member moving the holder in the optical axis direction; and a biasing member urging the holder toward the cam member, wherein: the holder is formed such that a lens frame holding a lens is inserted against a biasing force of the biasing member and assembled into the holder from one side of the holder to another side of the holder; the holder is adjustable in the optical axis direction; and the cam member is disposed close to the one side with respect to the holder.

This configuration prevents the concentration of the load, applied to the holder at the time when the lens frame is assembled into the holder, on the cam member. Thus, it is possible to prevent the deformation of the cam member and to maintain the part accuracy. This prevents the variation, caused by the cam member, in the positional accuracy of the holder in the optical axis direction. This also suppresses the occurrence of defective operation of the holder.

BRIEF DESCRIPTION OF THE DRAWINGS

Preferred embodiments of the present invention will be described in detail with reference to the following drawings, wherein.

DESCRIPTION OF THE PREFERRED EMBODIMENTS

In the following, a description will be given of an embodiment according to the present invention with reference to the drawings.

Figure 1:
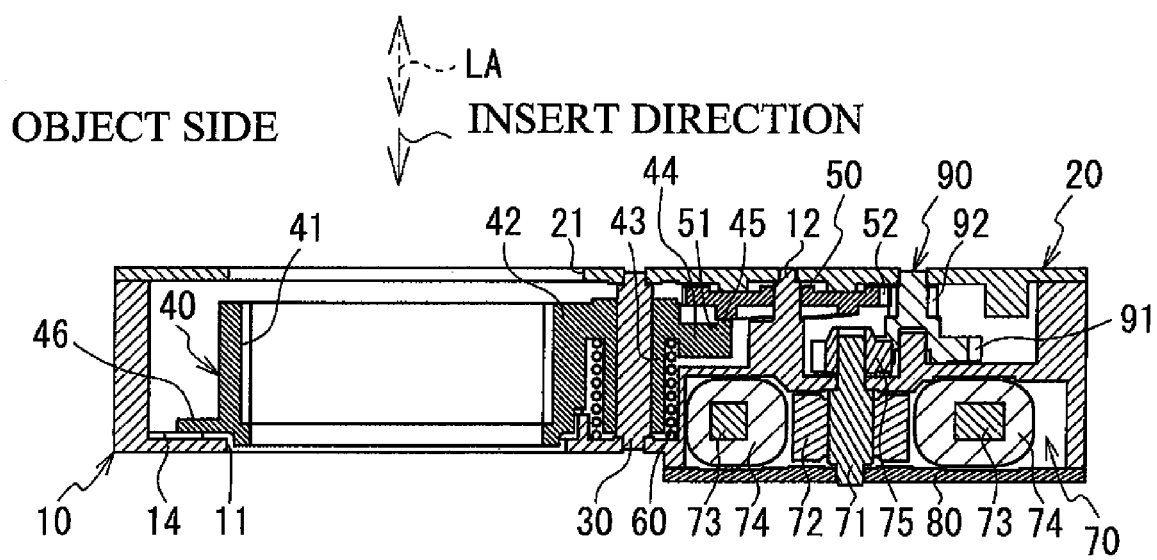
FIG. 1 is a cross-sectional view of a lens drive apparatus according to the present embodiment of the present invention.

FIG. 1 is a cross-sectional view of a lens drive apparatus according to the present embodiment of the present invention.

The lens drive apparatus includes: a base member 10; a cover member 20; a guide rod 30; a holder 40; a cam member 50; a biasing member 60; a motor unit 70; a plate 80; and a gear 90. Herein, in FIG. 1, the upper side is an object side and the lower side is an image pickup device side, the image pickup device (not shown) imaging the objective light.

The base member 10 and the cover member 20 define a housing holding the guide rod 30, the holder 40, the cam member 50, the biasing member 60, the motor unit 70 or the likes.

The base member 10 has an opening 11. The cover member 20 has an opening 21.

The guide rod 30 is supported so as to be parallel with the optical axis direction LA by the base member 10 and the cover member 20. In addition, the guide rod 30 guides the holder 40 in the optical axis direction LA.

The holder 40 includes: a cylindrical portion 42 having the opening 41; a bearing portion 43 formed in an outer side of the cylindrical portion 42; and a protruding portion 44 protruding radially outwardly in a radial direction form the bearing portion 43. A protruding portion 46 and a linear-guiding portion 47 are formed in the out side of the cylindrical portion 42.

The openings 11, 21, and 41 are concentric with one another. The objective light passes through the openings 11, 41, and 21, and reaches the image pickup device.

An internal thread is formed in the inner periphery of the opening 41, so as to be screwable with a lens frame (not shown) having a lens (not shown). In order to assemble the lens flame into the holder 40, the lens frame is inserted from the object side (one side) of the holder 40 to the image pickup device side (another side) of the holder 40, and the lens flame is then rotated by a predetermined amount, so that the opening 41 and the lens frame are screwed and assembled. By adjusting the screwing amount, the position of the lens frame in the optical axis direction LA can be finely adjusted. Thus, focus adjustment before shipment can be accomplished.

Figure 2:
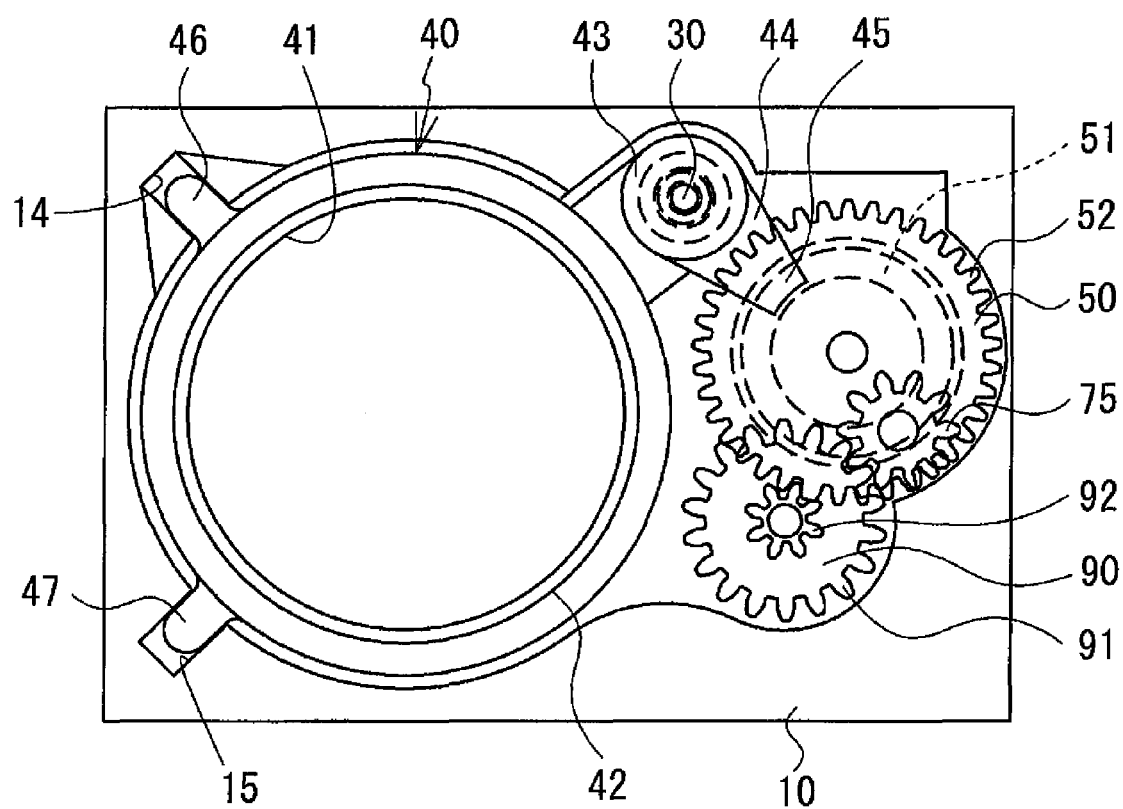
FIG. 2 is a front schematic view of the lens drive apparatus.

Additionally, the guide rod 30 penetrates the bearing portion 43 in the optical axis direction LA. The bearing portion 43 is slidable with respect to the guide rod 30, so that the bearing portion 43 is guided in the optical axis direction LA by the guide rod 30. Further, the movement of the holder 40 is restricted in a direction perpendicular to the traveling direction thereof in a straight line by the linear-guiding portion 47 and a liner guide channel 15 formed in the base member 10. The protruding portion 44 is thinner from the center of the guide rod 30 toward the end thereof as shown in FIG. 2. In addition, a surface, close to the object side, of the protruding portion 44 is provided with a cam follower 45 which is in contact with a cam surface 51 of the cam member 50.

Further, in the cylindrical portion 42, the protruding portion 46 is formed in the opposing side of the motor unit 70 and the cam member 50, and the protruding portion 46 is radially protruded. Also, as shown in FIG. 2, in the base member 10, an engagement portion 14 is formed to be corresponded to the protruding portion 46. The protruding portion 46 and the engagement portion 14 have a function of preventing the holder 40 from moving in the rotational direction thereof, that is to say, in the direction perpendicular to the inserting direction of the lens frame, when the lens frame is assembled into the holder 40.

The cam member 50 is provided for moving the holder 40 in the optical axis direction LA, and is rotatably supported by a shaft portion 12 formed in the base member 10. The cam member 50 has the cam surface 51 at its surface close to the image pickup device side. The rotation of the cam member 50 allows the cam surface 51 to activate the cam follower 45, thereby moving the holder 40 in the optical axis direction LA.

Further, the cam member 50 is disposed closer to the object side than the holder 40.

The cam member 50 has a tooth 52 at a periphery thereof, and the tooth 52 engages a small tooth 92 of the gear 90. The gear 90 has a large tooth 91 having larger than the small tooth 92 in diameter, and the large tooth 91 engages with a pinion gear 75.

The motor unit 70 includes: a shaft 71; a rotor 72; a stator 73; coils 74; and the pinion gear 75. The motor unit 70 is disposed within the space defined by the base member 10 and the plate 80.

The rotor 72 has a cylindrical shape and is magnetized with different magnetic poles in a circumferential direction. The shaft 71 penetrates the rotor 72. The shaft 71 is rotatably supported on the base member 10 and the plate 80. The energization of the coils 74 allows the stator 73 to magnetically activate the rotor 72, thereby rotating the rotor 72.

The pinion gear 75 is press-fitted on one end of the shaft 71.

Therefore, the driving of the shaft 71 rotates the cam member 50 via the pinion gear 75, the large tooth 91, the small tooth 92, and the tooth 52.

The biasing member 60 is disposed concentrically with the guide rod 30 and the bearing portion 43, and is disposed between the base member 10 and the holder 40. The biasing member 60 urges the holder 40 in the optical axis direction LA, that is to say, toward the cam member 50. This maintains the contact state of the cam surface 51 and the cam follower 45 formed on the protruding portion 44, and transmits the action in response to the rotation of the cam member 50 to the holder 40.

Next, a description will be given of the load applied to the lens drive apparatus when the lens frame is assembled.

Figure 3:
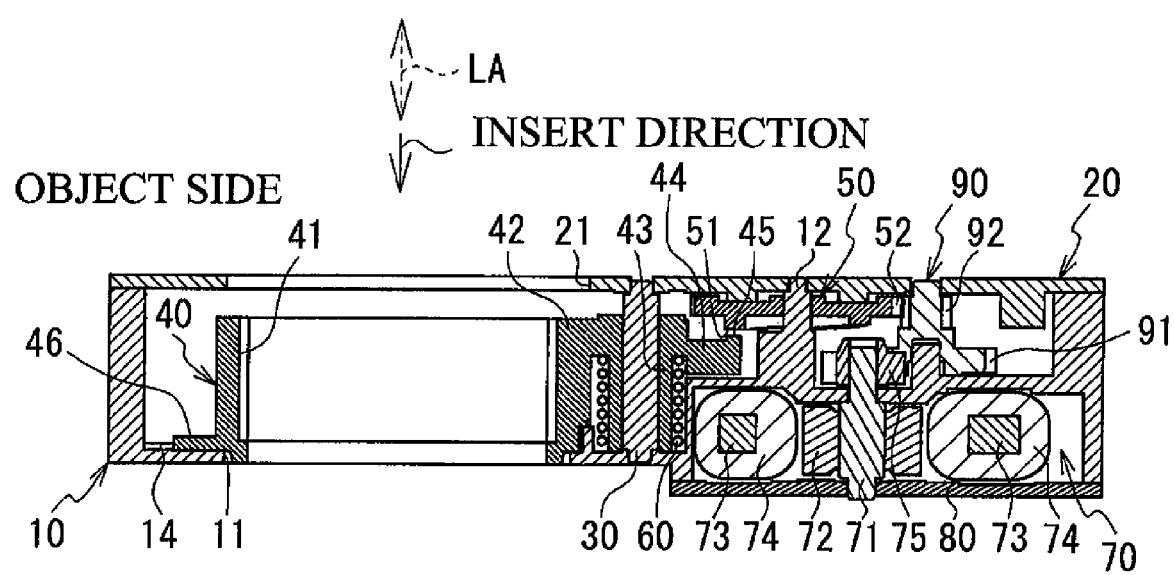
FIG. 3 is a cross-sectional schematic view of the lens drive apparatus when the lens frame is assembled into the lens drive apparatus.

FIG. 3 is a cross-sectional schematic view of the lens drive apparatus when the lens frame is assembled into the lens drive apparatus.

As shown in FIG. 3, when the lens frame is inserted toward the holder 40 against the biasing force of the biasing member 60, the holder 40 moves from the object side toward the image pickup device side. This movement allows the cam follower 45 to disengage with the cam surface 51. In addition, an end surface, closer to the image pickup device side, of the cylindrical portion 42 comes in contact with a peripheral portion of the opening 11 of the base member 10, thereby restricting the movement of the holder 40 in the optical axis direction LA.

Figure 4:
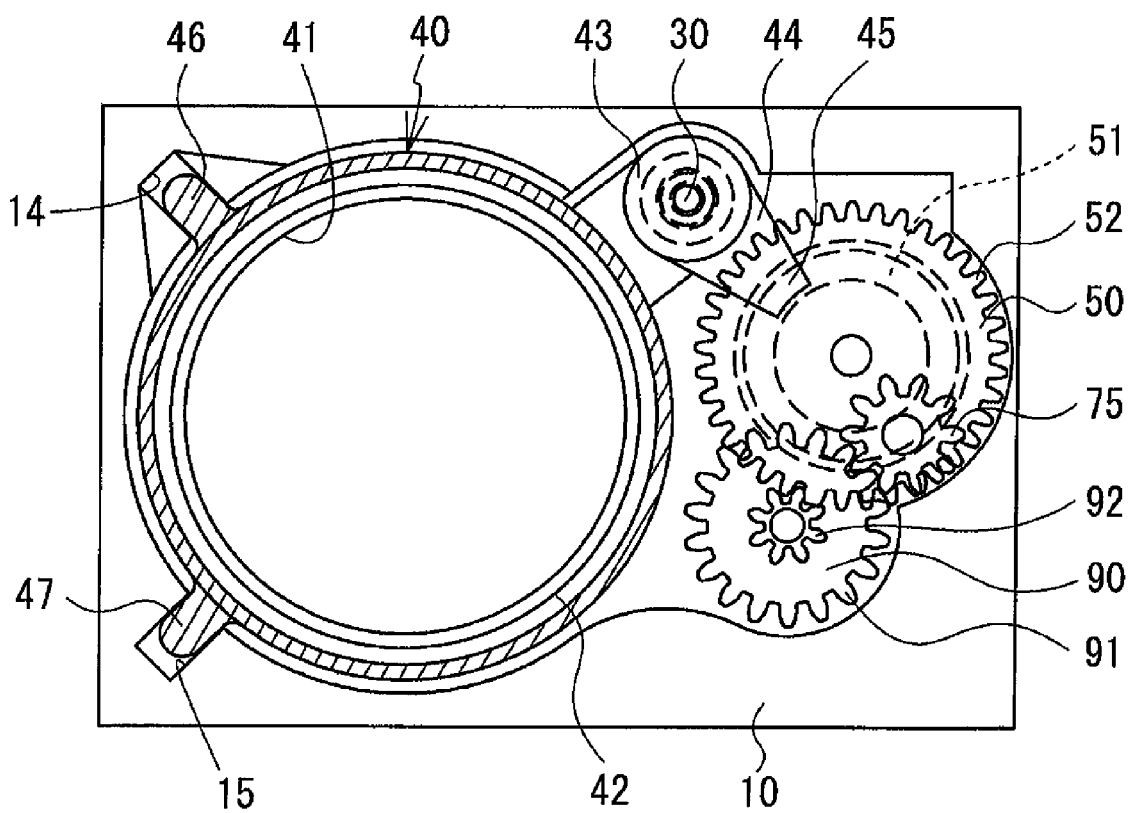
FIG. 4 is a front schematic view of the lens drive apparatus, showing the contact area of the holder and the base member.
Figure 5:
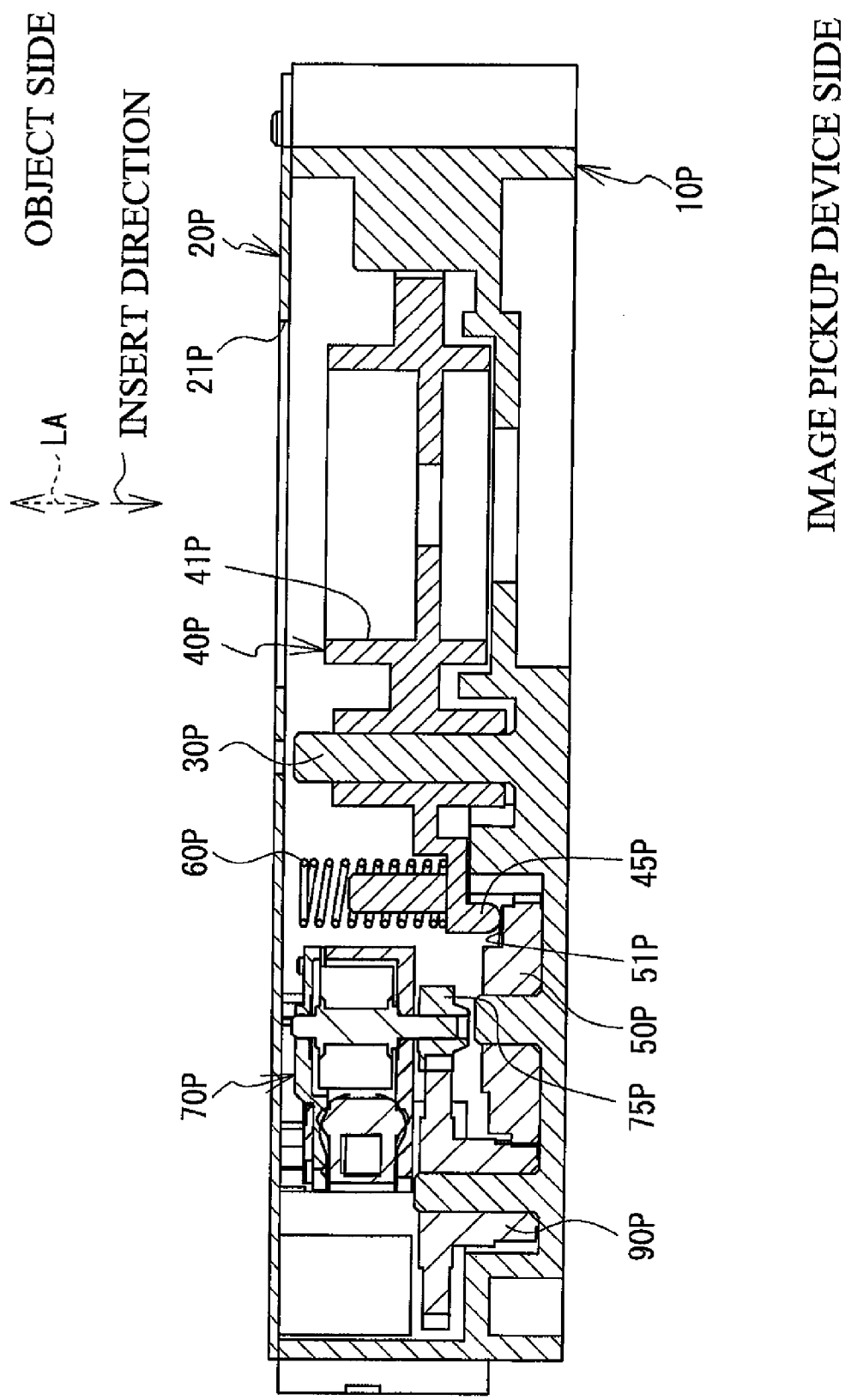
FIG. 5 is a cross-sectional view of a conventional lens drive apparatus.

FIG. 4 is a front schematic view of the lens drive apparatus, showing the contact area of the holder and the base member. Referring to FIG. 4, the contact area of the holder 40 and the base member 10 is represented by diagonal lines. As shown in FIG. 4, the contact area of the holder 40 and the base member 10 substantially has a circular shape with respect to the optical axis. Thus, the load on the holder 40 is applied to this contact area.

Additionally, as shown in FIGS. 3 and 4, the holder 40 moves toward the image pickup device side at the time when the lens frame is assembled into the holder 40, and then the protruding portion 46 and the engagement portion 14 are engaged with each other. This restricts the movement of the holder 40 in the direction perpendicular to the optical axis direction LA, when the lens frame is assembled into the holder 40.

As mentioned above, the load on the holder 40, at the time when the lens frame is assembled into the holder 40, is applied to the holder 40 and the base member 10. This is because the cam member 50 is disposed at the object side (one side) instead of the image pickup device side (another side). This prevents the concentration of the load on the cam member 50. This maintains the accuracy of the parts, such as the opening 41, the cam follower 45 and the cam surface 51, and restricts variations in the positional accuracy of the holder 40 against the cam member 50 in the optical axis direction LA. This also suppresses the occurrence of defective operation of the holder 40.

Further, as shown in FIG. 4, the contact area is the substantially has the circular shape with respect to such a direction that the lens frame is inserted, that is to say, with respect to the optical axis. Therefore, a large area can be used for the contact area. When the lend frame is inserted, the load applied to the holder 40 and the base member 10 can be prevented from concentrating on a single point. This also prevents the degradation of the part accuracy.

Additionally, the protruding portion 46 and the engagement portion 14 are engaged with each other when the lens frame is assembled into the holder 40, thereby preventing the holder 40 from moving in the direction perpendicular to the optical axis direction LA. This restricts the degradation of the part accuracy caused by the deformation of the holder 40 or the linear-guiding portion 47 according to the movement of the holder 40 in the direction perpendicular to the insert direction, when the lens frame is assembled into the holder 40 and the screwing amount is adjusted. Particularly, in the case of a conventional lens drive apparatus that is not provided with the protruding portion 46 and the engagement portion 14, the force is applied to the holder 40 in the optical axis direction LA by rotating the lens frame, and the load might be concentrated on the guide rod 30, the holder 40, or the likes. When the load is concentrated on the guide rod 30 and the linear-guiding portion 47, the movement of the holder 40 in the optical axis direction LA might be disturbed by the deformation of the guide rod 30, the linear-guiding portion 47 or the likes. The lens drive apparatus according to an aspect of the present invention makes it possible to distribute the load on any parts by the rotation of the lens frame, thereby preventing the degradation of the part accuracy and restricting the effect on the guide rod 30. Additionally, it is also possible to prevent the occurrence of the chattering of the holder 40 in the direction perpendicular to the optical axis direction LA. This enables long-term use.

Additionally, in the case where a clearance C1, between the protruding portion 46 and the engagement portion 14 in the direction perpendicular to the optical axis direction LA, is smaller than a clearance C2, between the linear-guiding portion 47 and the liner guide channel 15 in the direction perpendicular to the optical axis direction LA, the load on the linear-guiding portion 47 can be restricted when the lens frame is attached. In this manner, since the part accuracy of the linear-guiding portion 47 can be maintained, the defective operation of the holder 40 can be suppressed.

While the preferred embodiments of the present invention have been illustrated in detail, the present invention is not limited to the above-mentioned embodiments, and other embodiments, variations and modifications may be made without departing from the scope of the present invention.

In the above embodiment of the present invention, the description has been given of the protruding portion 46 and the engagement portion 14 that are provided in one position. However, the load on the guide rod 30 or the linear-guiding portion 47 may be further distributed by providing plural protruding portions 46 and engagement portions 14.

Finally, several aspects of the present invention are summarized as follows.

According to an aspect of the present invention, there is provided a lens drive apparatus including: a holder having a cylindrical shape and movably supported in an optical axis direction; a cam member moving the holder in the optical axis direction; and a biasing member urging the holder toward the cam member, wherein: the holder is formed such that a lens frame holding a lens is inserted against a biasing force of the biasing member and assembled into the holder from one side of the holder to another side of the holder; the holder is adjustable in the optical axis direction; and the cam member is disposed close to the one side with respect to the holder.

This configuration prevents the concentration of the load, applied to the holder at the time when the lens frame is assembled into the holder, on the cam member. Thus, it is possible to prevent the deformation of the cam member and to maintain the part accuracy. This prevents the variation, caused by the cam member, in the positional accuracy of the holder in the optical axis direction. This also suppresses the occurrence of defective operation of the holder.

In the above configuration, the a lens drive apparatus may further includes a base member supporting the holder for movement in the optical axis direction, wherein the base member prevents the holder from moving in the inserted direction of the lens frame by contacting with an end surface, closer to the another side, of the holder, when the lens frame is assembled to the holder.

With such a configuration, since the base member comes into contact with the end surface, closer to another side, of the holder, a large area can be used for the contact area and also the load can be prevented from concentrating on a single point. This prevents the deformation of the cam member by the load applied to the holder when the lens frame is assembled, and maintains the part accuracy. This prevents the variation, caused by the cam member, in the positional accuracy of the holder in the optical axis direction.

In the above configuration, the one side is an object side, and another side is an image pickup device side.

In the above configuration, the holder may be assembled into the lens frame by screwing the holder into the lens frame, and the lens drive apparatus may include restricting means restricting a movement of the holder in a direction perpendicular to the inserted direction when the lens frame is assembled into the holder.

This configuration prevents the deformation of the holder according to the movement of the holder in the direction perpendicular to the insert direction, and also maintains the part accuracy. This prevents the variation, caused by the cam member, in the positional accuracy of the holder in the optical axis direction, and prevents the occurrence of the defective operation of the holder.

In the above configuration, the restricting means may include a protrusion protruding radially outwardly from the holder in a radial direction, and an engagement portion engagable with the protrusion may be provided in the base member.

This configuration improves the part accuracy with a simple structure. This also prevents the variation, caused by the cam member, in the positional accuracy of the holder in the optical axis direction, and prevents the occurrence of the defective operation of the holder.

What is claimed is:

1. A lens drive apparatus comprising:
a holder having a cylindrical shape and being slidably supported in an optical axis direction;
a cam member moving the holder in the optical axis direction; and
a biasing member urging the holder toward the cam member,
wherein:
the holder is formed such that a lens frame holding a lens is inserted into the holder against a biasing force of the biasing member and assembled into the holder from one side of the holder to an other side of the holder, the holder is adjustable in the optical axis direction,
the cam member is disposed close to the one side with respect to the holder,
the one side is an object side, and
the other side is an image pickup device side.

2. The lens drive apparatus according to claim 1, further comprising a base member supporting the holder for movement in the optical axis direction, wherein the base member prevents the holder from moving in the inserted direction of the lens frame by contacting with an end surface, closer to the another side, of the holder, when the lens frame is assembled to the holder.

3. The lens drive apparatus according to claim 2, wherein the one side is an object side, and the another side is an image pickup device side.

4. The lens drive apparatus according to claim 3, wherein the holder is assembled into the lens frame by screwing the holder into the lens frame, the lens drive apparatus including restricting means restricting a movement of the holder in a direction perpendicular to the inserted direction when the lens frame is assembled into the holder.

5. The lens drive apparatus according to claim 4, wherein:
the restricting means includes a protrusion protruding radially outwardly from the holder in a radial direction; and
an engagement portion engagable with the protrusion is provided in the base member.

6. The lens drive apparatus according to claim 2, wherein the holder is assembled into the lens frame by screwing the holder into the lens frame, the lens drive apparatus including restricting means restricting a movement of the holder in a direction perpendicular to the inserted direction when the lens frame is assembled into the holder.

7. The lens drive apparatus according to claim 6, wherein:
the restricting means includes a protrusion protruding radially outwardly from the holder in a radial direction; and
an engagement portion engagable with the protrusion is provided in the base member.

8. The lens drive apparatus according to claim 1, wherein the holder is assembled into the lens frame by screwing the holder into the lens frame, the lens drive apparatus including restricting means restricting a movement of the holder in a direction perpendicular to the inserted direction when the lens frame is assembled into the holder.

9. The lens drive apparatus according to claim 8, wherein:
the restricting means includes a protrusion protruding radially outwardly from the holder in a radial direction; and
an engagement portion engagable with the protrusion is provided in the base member.

10. The lens drive apparatus according to claim 1, wherein the holder is assembled into the lens frame by screwing the holder into the lens frame, the lens drive apparatus including restricting means restricting a movement of the holder in a direction perpendicular to the inserted direction when the lens frame is assembled into the holder.

11. The lens drive apparatus according to claim 10, wherein:
the restricting means includes a protrusion protruding radially outwardly from the holder in a radial direction; and
an engagement portion engagable with the protrusion is provided in the base member.

* * * * *